United States Patent [19]

Craigie

[11] 4,196,879
[45] Apr. 8, 1980

[54] EJECTOR RELEASE UNIT FOR AIRBORNE STORES HAVING LOCKABLE SWAY BRACE ASSEMBLY

[75] Inventor: Samuel W. Craigie, Slough, England

[73] Assignee: M.L. Aviation Company Limited, Slough, England

[21] Appl. No.: 877,530

[22] Filed: Feb. 13, 1978

[30] Foreign Application Priority Data

Feb. 15, 1977 [GB] United Kingdom ............... 6280/77
Jul. 11, 1977 [GB] United Kingdom ............. 29064/77

[51] Int. Cl.² ............................................. B64D 1/02
[52] U.S. Cl. ................................ 244/137 R; 89/1.5 B
[58] Field of Search ............. B64D/1/02; 244/137 R; 89/1.5 R, 1.5 B, 1.5 G, 1.5 F, 1.5 H

[56] References Cited

U.S. PATENT DOCUMENTS

| 3,056,623 | 10/1962 | Herbert | 244/137 R |
| 4,008,645 | 2/1977 | Herbert | 89/1.5 G X |
| 4,050,656 | 9/1977 | Peterson | 89/1.5 B X |

Primary Examiner—Barry L. Kelmachter

Attorney, Agent, or Firm—Sughrue, Rothwell, Mion, Zinn and Macpeak

[57] ABSTRACT

An ejector release unit comprising a pair of hooks for supporting a store and an ejection device for ejecting a store supported by the hooks also includes, adjacent each hook, a sway brace assembly comprising a pair of pads for engagement with the upper surface of a store supported by the hooks, the pads being so mounted that during loading of a store they are free to yield, but at the completion of loading are locked firmly in position in contact with the surface of the store by way of irreversible mechanical connections exerting a thrust on the pads and resisting reverse movement. Each irreversible connection includes a slideable member having an end surface co-operating with a wedge-shaped surface on a vertically slideable member. The vertically slideable members may be held in an upper position against the effect of a downward bias by a latch engaging recesses in the sides of the members and withdrawn simultaneously by an interlock linkage coordinated with the locking of the hooks in the closed position, whereafter the members move downwardly to engage and lock the respective slideable members and hence the pads.

8 Claims, 6 Drawing Figures

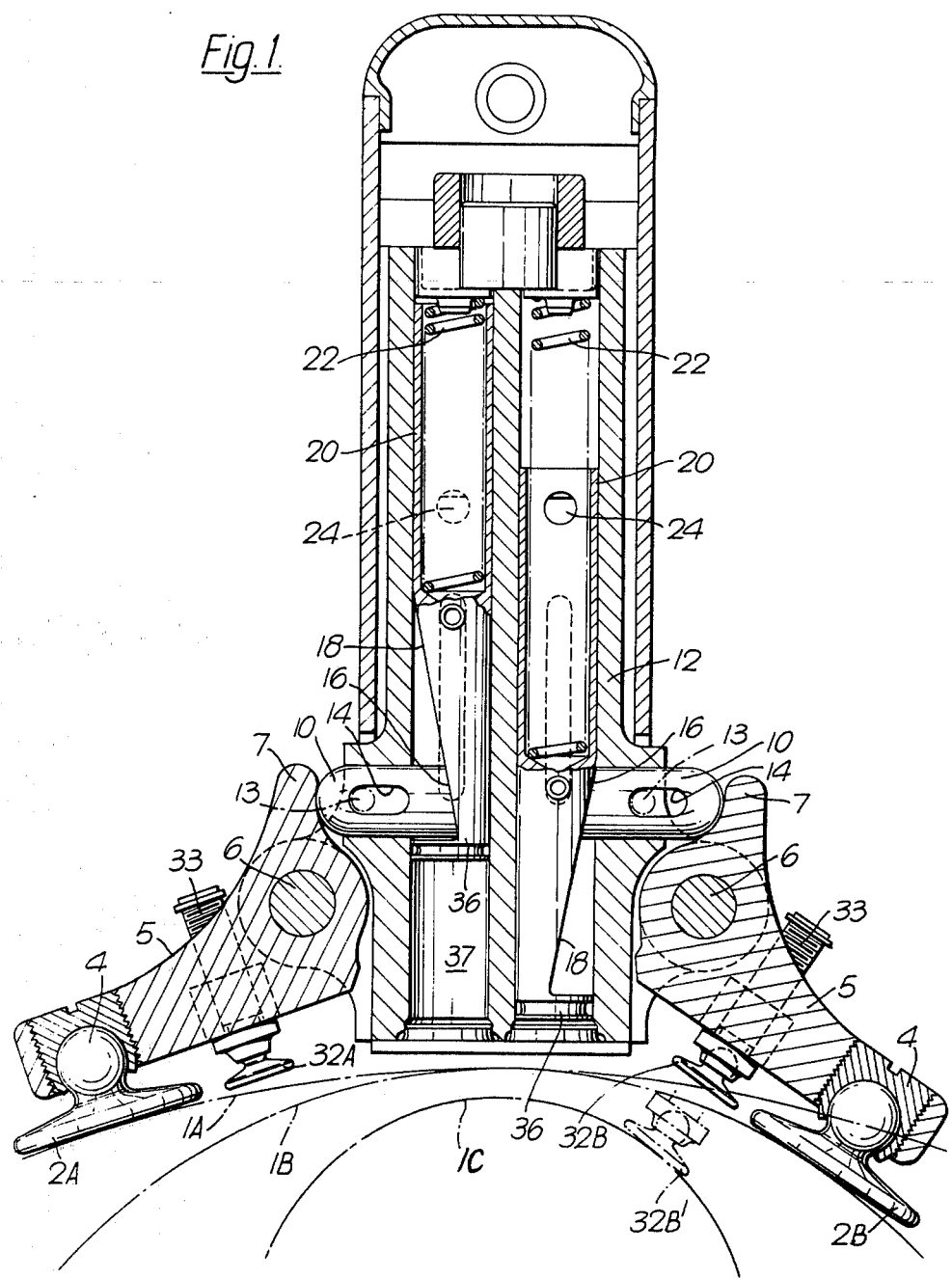

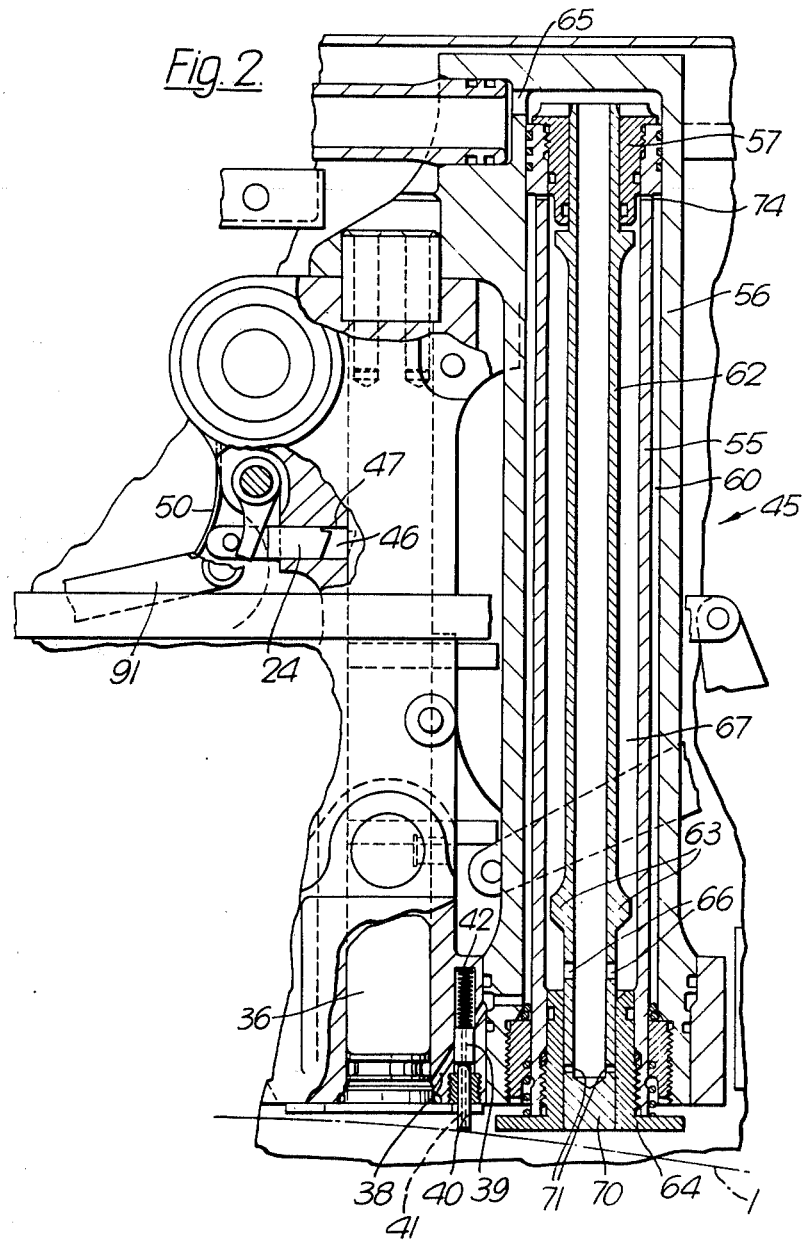

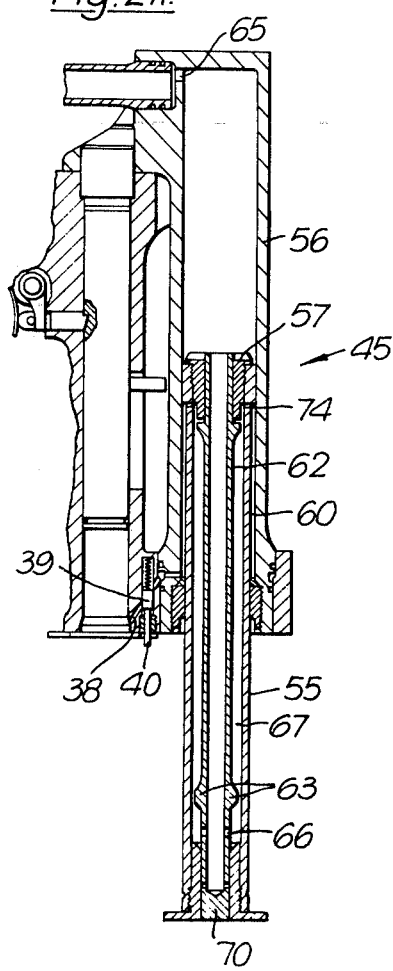
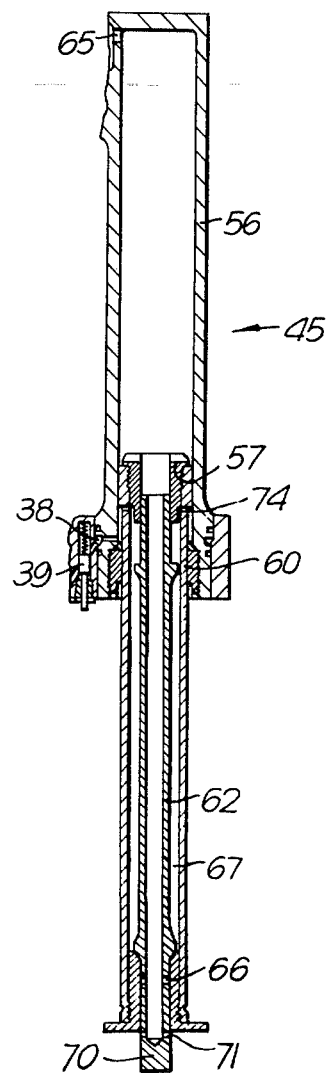

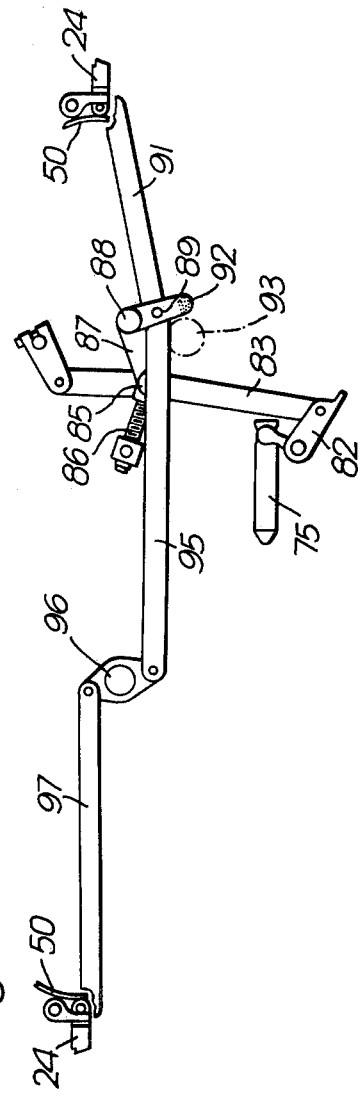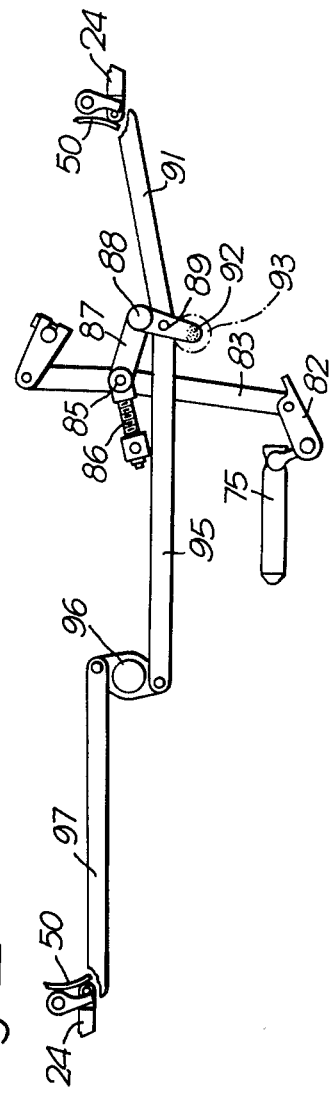

EJECTOR RELEASE UNIT FOR AIRBORNE STORES HAVING LOCKABLE SWAY BRACE ASSEMBLY

This invention relates generally to ejector release units for use in aircraft for holding heavy stores in position beneath the aircraft and for subsequently releasing and ejecting the store. The invention is particularly concerned with the so-called sway brace assembly forming part of an ejector release unit and serving to prevent the store from swaying in a transverse direction about an axis defined by a line through the supporting hooks of the ejector release unit. For this purpose, a pair of adjustable pads are commonly provided on either side of each hook so as to bear against the upper surface of the store and thus to prevent the swaying movement just referred to.

A typical example of such an assembly is shown in our British patent specification No. 1,248,926 in FIG. 1 and, more particularly, in FIG. 2, the supporting hooks being shown as 4 and 5 and the pads as 41. Each pad is mounted at the end of a transverse arm on which it is adjustable by means of a screw-threaded shank provided with a lock nut on the upper side of the respective arm. Before the store is loaded in position, the pads are screwed upwardly so as not to impede the movement of the store and, during this stage of the operation, the hooks are in the released or "open" position corresponding to the collapsed position of an associated toggle linkage. Once the store has been adjusted to its correct position, the hooks are moved to their operative position by re-setting the toggle linkage, the pads then being screwed down into firm engagement with the upper surface of the store and locked in this position by means of their lock nuts.

As can be understood, this is a time-consuming operation since before the pads can be raised in the first place, the lock nuts must be released and the pads then screwed upwardly. Once the store is in position, the process is reversed, the pads being screwed down individually and then locked in position by their lock nuts. Since there are two pads associated with each hook, there is a total of four pads, each of which must be adjusted individually.

According to the present invention, the pads of a sway brace assembly are so mounted that during loading of a store they are free to yield and the assembly includes mechanism for locking the pads firmly in position in contact with the surface of the store at the completion of loading. At the start of the loading operation, the pads will be in a lowered position and, as the store is manoeuvred on its loading trolley, it comes into contact with the pads which yield progressively as the store is raised into its position for engagement by the hooks. Once the hooks have been moved to their operative position, the pads are locked in position by operation of the locking mechanism. In this way, individual adjustment of the pads is avoided and the loading operation as a whole is much simplified.

The locking of the pads is preferably achieved by way of an irreversible mechanical connection rendered effective at the completion of loading to exert a thrust on the pads and then to resist reverse movement. This irreversible connection may include a slideable member having an end surface co-operating with a cam surface moving in a direction transverse to the direction of sliding. The movement of the cam surface exerts the required thrust on the slideable member and hence on the associated pad or pads, but any potential reverse movement of the slideable member is resisted by the presence of the cam surface.

The pads are preferably locked independently by separate members, each having an irreversible connection. As an alternative, the pads of each pair associated with a respective hook may be mounted to move together on a common supporting member so that locking of this member locks both pads of a pair. If such a common supporting member is used, this may be in the form of a plunger capable of vertical movement in a cylinder, the pads being supported by arms extending laterally from this plunger. The plunger then constitutes the slideable member referred to above which is locked by means of a cam surface co-operating with the end of the plunger.

When the pads are locked independently, as is preferred, each pad may be mounted on an arm pivoted to the body of the unit and having a part engaged by the respective slideable member. Each slideable locking member may extend substantially horizontally and may co-operate with a respective cam in the form of a wedge-shaped surface on a vertically slideable member which may be held in an upper position against the effect of a downward bias so that, when released, it moves downwardly to engage and lock the respective slideable member. The vertically slideable members may be held in the upper position by means of latch engaging recesses in the sides of the members and released by an interlock linkage co-ordinated with the locking of the hooks in the closed position. For this purpose the linkage may be operated by a mechanical lock for the hooks. The latch may be constituted by a pair of slideable pins engaging recesses in the respective members and withdrawn by the linkage or it may comprise a common D-shaft which is rotated by the linkage to bring its flat side parallel with the members and thus to release them.

A sway brace assembly forming part of an ejector release unit in accordance with the invention will now be described, by way of example, with reference to the accompanying drawings in which:

FIG. 1 is a longitudinal sectional view seen along the axis of a store supported by the unit;

FIG. 2 is a side view, partly in section, of part of the assembly seen in FIG. 1 together with an associated ejection device and an interlock connection;

FIGS. 2A and 2B are sectional views to a reduced scale showing subsequent operational positions of the ejection device; and FIGS. 3A and 3B are views to a similar reduced scale showing alternative positions of the interlock connections.

Turning first to FIG. 1, the assembly is illustrated in association with three different diameters of store indicated by the dotted lines 1A, 1B and 1C. Pads 2A and 2B are shown in engagement with the surfaces 1A and 1B respectively, purely for the purpose of illustrating the positions of these pads since in practice both pads will take up substantially equivalent positions. Each pad is mounted by a ball-joint connection 4 on an arm 5 pivoted at 6 to the frame of the unit. Each arm 5 has a short extension 7, thus effectively constituting a bell crank lever and these extensions are engaged by sliding links 10 which are mounted for horizontal sliding movement in corresponding openings in a housing member 12, being held captive by pins 13 co-operating with slots 14 in the links 10.

Each link 10 has an end surface 16 which co-operates with a respective wedge-shaped cam surface 18 formed at the lower end of a respective, vertically movable member 20. The upper portion of each member 20 is hollow and encloses a compression spring 22 which biases each member 20 downwardly and, in the position illustrated in FIG. 1, causes the respective cam surface 18 to press its link 10 outwardly against the respective extension 7, so that each arm 5 is turned in a direction to press the respective pad 2A, 2B firmly against the surface of the store.

During loading of a store, each member 20 is held up against the force of its spring 22 by a pin 24 which engages a recess (not see in FIG. 1) in the rear face of the respective member 20. This holds the cam surfaces 18 clear of the ends 16 of the ends 16 of the links 10 so that the links are free to slide horizontally and the pads 2A and 2B are free to yield in a upward direction as a store is loaded. As the store is progressively raised to a position in which it can be engaged by the hooks of the unit, the pads 2A, 2B are raised with it and the links 10 are moved inwardly. When the store reaches its final position, the hooks are locked manually and operation of the lock withdraws the pins 24 by means of an interlock connection to be described in relation to FIGS. 2 and 3, thus releasing the members 20. These move downwardly under the bias of the springs 22, pressing the cam surfaces 18 against the ends 16 of the links 10 and thrusting the pads 2A and 2B firmly against the surface of the store. Owing to the irreversible nature of the connection, the pads are prevented from yielding in an upward direction and the store is thus firmly held. If, however, during operation the store swings very slightly in one direction or the other so as to reduce the pressure on one of the pads 2A, 2B, the effect of the continuing bias by the respective spring 22 is to force the respective link 10 outwardly to a very slight extent so as to restore the clamping pressure to the pad in question. When the store swings back there is, of course, a reverse action so that any incipient swinging movement of the store leads to a general tightening up of the crutching pads.

As mentioned previously, the pads will normally take up a symmetrical position rather than that illustrated in FIG. 1, but the fact that the pads are locked individually facilitates the crutching of an irregularly shaped store, i.e. a store having an upper surface which departs from the circular arcs 1A, 1B and 1C illustrated in FIG. 1. When operating with such a store, one pad may be forced downwardly considerably further than the other and they may, in fact, take up positions similar to those shown in FIG. 1.

If the store is of particularly small diameter as shown at 1C, this is beyond the range of adjustment of the pads 2A and 2B because it will be seen that the pad 2B is already in its limiting position with the link 10 engaging the top portion of the cam surface 18. In order to accommodate such smaller stores, the arms 5 each carry a second, smaller pad 32A, 32B mounted between the respective main pad and the pivot 6. When the pads 2A, 2B are in use, the pads 32A, 32B are retracted as shown in the drawing, but when required can be extended, for example to the position shown in dotted lines as 32B' by means of a screw adjustment provided by a threaded stem 33. The adjustment is completed prior to the loading operation and thereafter, the operation proceeds in respect of the pads 32A, 32B in the same manner as previously described in relation to the pads 2A, 2B.

When a store has been released, the assembly as a whole needs to be re-set before the next store can be loaded, i.e. the members 20 need to be returned to the position where they are retained by the pins 24. For this purpose, the lower part of each member 20 is formed as a piston 36 working in a cylinder 37 to which gas pressure is admitted as illustrated in FIG. 2.

Most of the structure illustrated in FIG. 1 is not visible in the elevation of FIG. 2, but the side of the housing is broken away to show one of the pistons at 36. Gas is admitted to the bottom of the cylinder 37 by way of a passage 38 which includes a valve 39 which is held in the position illustrated by a plunger 40 which engages the upper surface of the store 1. The valve is biased downwardly by a spring 42 and as soon as the store is released, the valve 39 is forced downwardly to open the passage 38. This allows gas to flow from the ejection gun shown generally as 45 which has, of course, been fired in order to obtain the release of the store 1. If, for any reason, the store fails to be released, the pads 2A, 2B must remain in the locked position and the interlock provided by the valve 39 prevents the gas passing to the cylinders 37. Instead the gas passes down a central bore 41 in the valve 39 and plunger 40 and thence to atmosphere to relieve the internal gas pressure. When the store is finally released, operation continues as previously described.

Part of the structure is broken away in FIG. 2 to show one of the pins 24 in elevation and it will be seen that it slides in a channel 46 and has an angled nose portion 47 for engaging the recess in the member 20. As described above, the pins 24 are retracted by an interlock linkage operated by a manual lock for the hooks. The hooks themselves are not shown, but the lock takes the form of a pin 75 which is interposed between two parts of the hook-operating mechanism. The pins 24 are biased by springs 50 into the engaged position and are retracted against the effect of the springs by links 91 and 97 when the hooks are locked. When the hooks are unlocked again to release the store, the spring pressure urges each pin 24 against the smooth side of the respective member 20 and when the member 20 has been returned to its uppermost position by means of the gas pressure as just described, each pin engages its respective recess and then holds the member 20 in its uppermost position.

Referring to details of the interlock as shown in FIGS. 3A and 3B, the pin 75 slides horizontally and is operated by a manually accessible bell crank 82 pivoted to a generally vertical link 83. At an intermediate point 85, the link 83 is connected to a toggle comprising a spring arm 86 and a rigid arm 87 turning about a fixed pivot 88 where it is connected to a short arm 89. The inclusion of the spring-loaded toggle causes the bell crank 82 to move with a snap action from one limiting position shown in FIG. 3A in which the pin 75 is fully withdrawn to the other limiting position shown in FIG. 3B in which the pin 75 is inserted in its locking position.

Movement from the position of FIG. 3A to that of FIG. 3B causes the arm 89 to turn in a clockwise direction about its pivot 88 causing a coloured lower portion 92 to move into register with an opening 93 in the casing of the unit to serve as an indicator of the position of the interlock system as a whole. The arm 89 is connected to the link 91 and to a generally horizontal link 95 which is moved to the left as the arm 89 turns from the position of FIG. 3A to that of FIG. 3B and, via a connection 96 moves the link 97 to the right. The link 91 moves to the left at the same time, thus withdrawing both the pins 24.

The ejection gun 45 also requires to be reset before a fresh store can be loaded and this can be achieved by the use of a volume of the pressure gas generated during the firing of the gun and which is stored for this purpose. The gun is of the same general type of construction as described in British patent specification No. 1,005,266 and includes a tubular piston 55 slideable within an outer housing 56. The head 57 of the piston 55 is a sliding fit within the housing 56, but the diameter of the cylindrical part is such as to leave a small annular space 60 between the cylindrical portion 55 and the housing 56. The piston also includes a tubular exhaust valve 62 capable of limited sliding movement in relation to the piston 55, as determined by projections 63.

The gun is fired by the detonation of an explosive cartridge which generates high pressure gas which flows along a passage 65 and enters the upper end of the housing 56. This acts on the head 57 of the piston 55 which starts to move downwardly as shown in FIG. 2A. At the same time, pressure gas passes down through the hollow interior of the exhaust valve 62 and passes through ports 66 and into a space 67 between the exhaust valve 62 and the piston 55.

When the piston 55 reaches the end of its travel as shown in FIG. 2B, the continued gas pressure within the interior of the exhaust valve 62 causes the latter to move downwardly in relation to the piston 55 so that a plug portion 70 projects below the bottom of the piston as shown. This closes the ports 66 but opens a second pair of ports 71 to atmosphere, thus allowing the pressure to be exhausted from the whole of the interior of the housing 56 and the exhaust valve 62, but leaving pressure gas trapped in the space 67 between the exhaust valve 62 and the piston 55. The pressure gas trapped in this region is able to pass by ports 74 into the space 60 between the piston 55 and the housing 56, which has contracted to a very short length by the downward movement of the piston 55.

The gas in this space then acts against the underside of the head 57 of the piston, thus moving this upwardly to return the piston to the position shown in FIG. 2. A proportion of the gas in the space 60 flows along the passage 38 as already described, the valve 39 having been opened by release of the store as soon as the ejection gun 45 is fired. The flow of gas along the passage 38 thus re-sets the member 20 of the sway brace assembly and the unit as a whole is then ready for re-loading.

I claim:

1. An ejector release unit, comprising: an ejection device for ejecting a hook-supported store, and a pair of sway brace assemblies, each comprising a pair of arms for engagement with the upper surface of the store, means mounting said arms for free pivoting movement during loading of the store, and a mechanism for locking each said arm firmly in position in contact with the surface of the store at the completion of loading, each said locking mechanism including a slidable locking member extending substantially horizontally to engage an associated arm, said slidable locking member having an end surface, a cam in the form of a wedge-shaped surface on a vertically slidable member cooperating with said slidable locking member end surface to exert a thrust on each said arm and to resist reverse movement of said arm, means holding each said vertically slidable member in an upper position, means biasing each said vertically slidable member downwardly, and means for releasing said holding means, whereby each said vertically slidable member, when released, moves downwardly to engage and lock an associated slidable locking member.

2. An ejector release unit as defined in claim 1, further comprising a store engaging pad mounted proximate an outer end of each arm.

3. An ejector release unit according to claim 1 in which said holding means comprises a latch engaging recess in the sides of said vertically slideable members, and said release means comprises an interlock linkage.

4. An ejector release unit according to claim 3 and including a mechanical lock for operating said interlock linkage.

5. An ejector release unit according to claim 3 in which said latch comprises a pair of slideable pins engaging said recesses in one of said vertically slideable members.

6. An ejector release unit according to claim 1, further comprising a pair of cylinders, a pair of pistons working in respective cylinders and controlling respective ones of said vertically slideable members, an ejection gun, and a connection for pressurized gas between said ejection gun and said cylinders, whereby pressurized gas generated by the firing of said ejection gun serves to return said vertically slideable members to their upper positions.

7. An ejector release unit according to claim 6, further comprising a valve in said pressurized gas connection, and means for opening said valve to permit gas flow upon the release of the store.

8. An ejector release unit according to claim 7, in which said opening means comprises a spring acting to open said valve, and a plunger for engaging the surface of the store held by said unit and holding said valve closed until release of said store.

* * * * *